United States Patent [19]
Browne

[11] 3,829,591
[45] Aug. 13, 1974

[54] FRUIT DE-STONING METHOD AND APPARATUS

[75] Inventor: David Alexander Browne, Bentleigh, Victoria, Australia

[73] Assignee: Filper Corporation, San Ramon, Calif.

[22] Filed: Mar. 2, 1973

[21] Appl. No.: 337,315

[52] U.S. Cl. ................................. 426/485, 99/553
[51] Int. Cl. ............................................. A23n 3/08
[58] Field of Search ............ 99/519, 537, 538, 547, 99/549, 551, 552, 553, 562, 563, 491, 564, 566; 426/481, 484, 485; 30/25

[56] References Cited
UNITED STATES PATENTS

| | | | |
|---|---|---|---|
| 1,785,007 | 12/1930 | Duncan | 99/553 |
| 1,785,019 | 12/1930 | Thompson et al. | 99/553 |
| 1,785,021 | 12/1930 | Whipple | 99/553 |
| 1,785,022 | 12/1930 | Duncan | 426/485 |
| 3,331,418 | 7/1967 | Amori | 99/491 |
| 3,465,799 | 9/1969 | Tomelleri | 99/553 |

FOREIGN PATENTS OR APPLICATIONS

| | | | |
|---|---|---|---|
| 636,141 | 4/1928 | France | 99/552 |

Primary Examiner—Donald E. Watkins
Attorney, Agent, or Firm—Townsend and Townsend

[57] ABSTRACT

A mechanism or knife assembly for de-coring fruit including at least one slicing blade and an elongate semi-circular coring blade which is mounted adjacent a cutting edge of the slicing blade and is rotatable relative to the slicing blade between inoperative and operative positions. The rotational axis of the coring blade lies generally within a plane containing the cutting edge of the slicing blade, and in the inoperative position the longitudinal axis of the coring blade also lies substantially within that plane, whereas in the operative position the coring blade extends laterally beyond each of two opposite sides of the slicing blade. In operation, an article of fruit is impaled on the slicing blade; the coring blade, which is then located within the body of the article of fruit, is rotated into its operative position; and the article of fruit is thereafter turned relative to both blades so that splitting and decoring of the article of fruit occur simultaneously.

11 Claims, 18 Drawing Figures

FRUIT DE-STONING METHOD AND APPARATUS

This invention relates to a method and apparatus for de-stoning fruits generally falling within the drupe family — for example, peaches and as a matter of convenience particular reference will be hereinafter made to peaches. De-stoning apparatus of the aforementioned type is commonly used to prepare fruit for canning.

Prior to this invention, de-stoning of fruit has been effected by two principle techniques — torque and spooning. In the former case, the fruit is cut substantially to the depth of the stone to form a separation between two halves of the fleshy body portion of the fruit, and those halves are finally parted by a twisting action which simultaneously causes the bond between the flesh and the stone to be broken. An advantage of this type of de-stoning is that a minimum amount of flesh of the fruit is lost in removing the stone. In some fruits however, and especially peaches, the flesh immediately surrounding the stone has a different colour (usually darker) to that of the main body of the fruit, and that colour difference can reduce the visual appeal of the fruit for canning, although the darker flesh is no less edible than the lighter flesh.

The aforementioned colour problem is overcome in the spooning technique, because in that technique the core section of the fruit containing the stone is scooped or spooned out of the body. Thus, the darker flesh material is removed, but the saving in fruit appearance is obtained at the cost of losing a substantial amount of edible material. The mechanism employed for this type of de-stoning is generally quite complex.

Not all fruit exhibits the dark core colour mentioned above, and the spooning method is especially wasteful when applied to fruits in which such a difference in colour does not occur. In practice however, little or no selection is applied to the type of fruit passed through the spooning type of apparatus.

A principal object of the present invention is to provide improved de-stoning mechanism for apparatus of the kind indicated, which in a preferred form can be applied to existing apparatus with minimum constructional alteration. A further object of the invention is to provide de-stoning mechanism which can be simply adjusted to operate on either the torque or spooning technique, as desired. It is yet another object of the invention to provide improved de-stoning apparatus having mechanism as aforesaid. Still another object of the invention is to provide an improved de-stoning method.

In accordance with one aspect of the invention, there is provided a knife assembly for use in fruit de-stoning apparatus including, at least one slicing blade; a coring knife having an elongate semi-circular blade which is mounted for rotation about an axis extending substantially radially thereof; said coring knife blade being located adjacent a cutting edge of said slicing blade and arranged so that the axis of rotation thereof and said cutting edge are substantially within a single plane; whereby said coring blade is movable relative to said slicing blade between a rest position in which its longitudinal axis is located substantially within said single plane, and an operative position in which it extends laterally beyond each of two opposite side surfaces of said slicing blade.

The invention also contemplates fruit de-stoning apparatus including such a knife assembly as described above.

In accordance with another aspect of the invention, there is provided a method of de-stoning fruit including the steps of: impaling an article of fruit on a slicing blade and simultaneously locating a semi-circular narrow coring blade within the body of said article so that it extends part-way around the stone of said article, rotating said coring blade through substantially 90° so that it extends laterally beyond each of two opposite sides of said slicing blade, and thereafter rotating said article relative to both said blades about an axis extending transverse to the slicing blade, whereby said article is sliced into two half-sections and a spherical core containing said stone is simultaneously separated from said half-sections.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

The invention is applicable to a wide range of known apparatus, but for convenience one typical apparatus will be described. That apparatus includes an upright orienting conveyor having a plurality of fruit supporting cups along its length. In operation, the cups cause articles of fruit supported thereon to adopt a particular disposition which is favourable for the subsequent de-stoning operation, which position and manner of orientation are both well known in the art. Consequently, the drawings forming part of this specification do not show the orienting conveyor.

Figure 1:
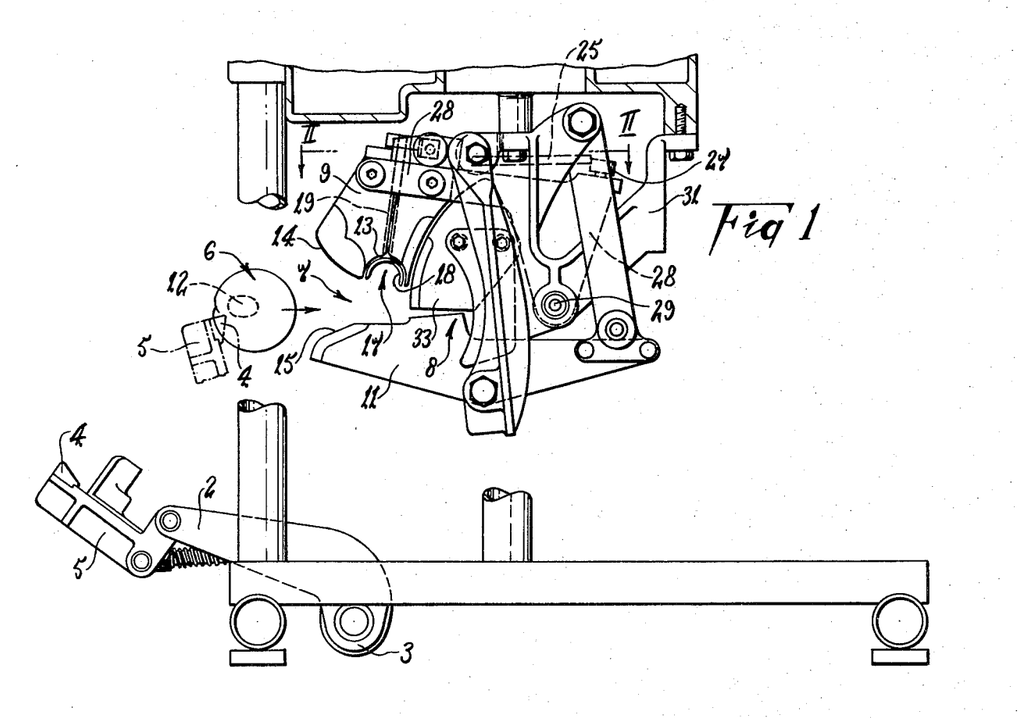
FIG. 1 is a semi-schematic side elevational view of part only of one particular fruit de-stoning apparatus incorporating an embodiment of the invention.

Transfer mechanism is provided to remove fruit from the orienting conveyor and locate it at a de-stoning station. Such mechanism generally includes a transfer cradle (which is also well known and is therefore not shown in the drawings) arranged to remove articles of fruit from the orienting conveyor, and a transfer arm 2 (see FIG. 1) arranged to remove fruit from the transfer cradle and feed that fruit into the de-stoning station. The transfer cradle is generally provided to remove an article of fruit from a conveyor cup as that cup moves downwards, and carries the article of fruit laterally outwards of the conveyor. The transfer arm 2 is usually pivotally mounted at one end portion 3 as shown in FIG. 1, and has one or two spikes 4 at its other end portion 5 arranged to penetrate the flesh of an article of fruit and retain that article on the arm 2. In operation, the or each spike 4 impales an article of fruit located on the transfer cradle, and the arm 2 then swings about its pivot to carry the impaled article of fruit 6 (see FIG. 1) towards and into the de-stoning station 7.

In the de-stoning station 7 the article of fruit 6 is located on a knife assembly 8, which in the embodiment of FIG. 1 includes two slicing blades 9 and 11. The blades 9 and 11 are arranged with one located above the other, and one blade (preferably the upper blade 9) is movable away from the other to allow free passage of the fruit stone 12 therebetween into a de-stoning position (see FIG. 4). Movement of the upper blade 9 is usually effected through cam mechanism, and one such mechanism will be hereinafter described. In the conventional apparatus of the kind under discussion, a recess 13 is usually provided in each blade 9 and 11 for receiving part of the stone 12 when the article of fruit 6 is in the de-stoning position, but the drawings show such a recess in the upper blade 9 only as that is a preferred arrangement for use with the present invention. The blades 9 and 11 are each provided with a cutting edge 14 and 15 respectively, and those sharpened cutting edges diverge away from the recess 13 to provide an entrance passage for an article of fruit.

It is preferred to apply the invention to typical apparatus as generally describe above, which has twisting or turning means at the de-stoning station 7 for engaging an article of fruit in that station and causing relative movement between the body or flesh part of the fruit and the stone. One such means includes a torque cup 16 (shown schematically in FIG. 3) located on each side of the slicing blades 9 and 11 and each having a cavity for receiving and engaging a respective half section of an article of fruit disposed in the de-stoning position. That is, the respective cavities face towards the blades 9 and 11 and are generally coaxial with the opening defined by the blade recess 13. Also, the cups 16 are mounted for movement towards and away from the blades 9 and 11.

The torque cups 16 are not shown or described in detail as their construction and manner of operation are well known in the art.

Figure 7:
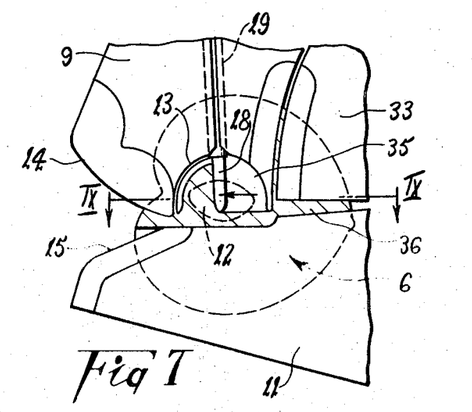
FIG. 7 is a view similar to FIG. 4 but showing the coring knife moved into its operative position.

When apparatus as described is modified to incorporate the present invention, a spooning or coring knife 17 is associated with one of the slicing blades 9 and 11, and in a preferred arrangement shown in the drawings, that knife is connected to the upper blade 9, although it may be connected to the lower blade 11 if desired. The coring knife 17 includes a narrow elongate blade 18 sharpened along each of its two opposite longitudinal sides and being bent between its ends so that in side elevation it has a substantially circular configuration, although in total it actually forms little more than a semi-circle. The word "circle" is to be understood in a broad sense, since the blade 18 may not follow a truly "circular" path, but may be simply curved in such a way as to receive a substantially half-section of a fruit stone 12 between its ends. It is further preferred that the coring knife blade 18 is widest at a central region in its length and is pointed or curved at its ends (see FIG. 7). Furthermore, the ends of the coring knife blade 18 preferably do not extend any substantial distance below the adjacent lower edge of the upper slicing blade 9, and in an inoperative or rest position as hereinafter described, the coring blade 18 in effect defines a false periphery of the slicing blade recess 13.

Figure 2:
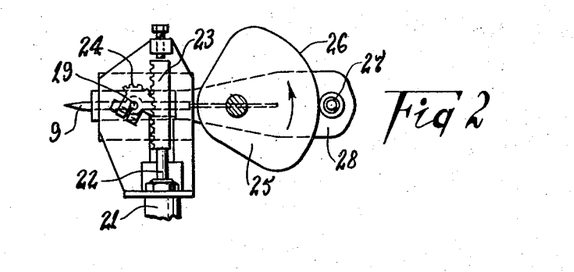
FIG. 2 is a sectional view taken along line II—II of FIG. 1, with parts being omitted for convenience of illustration.
Figure 4:
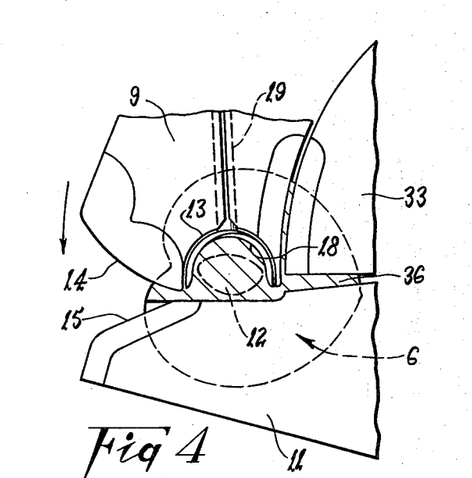
FIG. 4 is an enlarged view of part of the knife assembly of FIG. 1 showing the relative positions of the various blades when an article of fruit is first located within that assembly.
Figure 5:
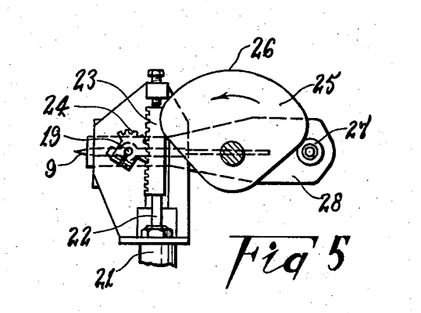
FIG. 5 is a view similar to FIG. 2 but showing the cam position which corresponds to the blade positions shown in FIG. 4.

Mounting of the coring blade 18 includes a rotatable spindle 19 secured at one end to a central region of the coring blade 18, and extending upwardly through a bore within the upper slicing blade 9. The upper end of the spindle 19 may be connected to any appropriate drive means but a double-acting or hydraulically operated piston actuator is preferred and such an actuator 21 is shown in FIGS. 2 and 5. In arrangement particular arrangeent shown, an actuator rod 22 carries a rack 23 which engages with a gear quadrant 24 secured to the upper end of the spindle 19. The travel of the rack 23 is such that a full stroke causes the spindle 19 to rotate through substantially 90° and thereby move the coring blade 18 between an inoperative or rest position in which it is confined substantially within the recess 13 as is shown in FIG. 4, and an operative position in which it extends transverse to the cutting edge 14 of the upper slicing blade 9. That is, in the operative position, approximately one half the coring blade 18 extends laterally outwards from each side of the upper slicing blade 9.

Actuation of the coring blade 18 can be regulated by any appropriate control means so as to ensure that the blade 18 does not move into the operative position until the blades 9 and 11 have adopted the relative positions shown in FIG. 4.

One particular cam mechanism for controlling movement of the blade 9 is shown in FIGS. 1 and 2, and includes a rotatable cam member 25 having a lobe surface 26 which is engageable with a cam follower 27. The cam follower 27 is carried by a bell-crank lever 28 which supports the blade 9 at one extremity and is pivotally mounted as at 29 on the apparatus frame 31. Movement of the blade 9 is synchronized with movement of the transfer arm 2 in a known manner.

Figure 16:
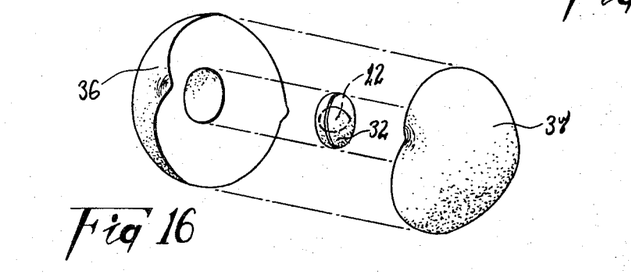
FIG. 16 is an exploded perspective view of a split and de-stoned article of fruit after treatment by the apparatus of FIG. 1.

Conventional apparatus of the kind discussed, generally includes means (not shown) for withdrawing the lower blade 11 to the right of FIG. 1 so as to remove the fruit core 32 (see FIG. 16) from that blade. Also, a back-up blade 33 is usually provided as shown in FIG. 1.

Figure 3:
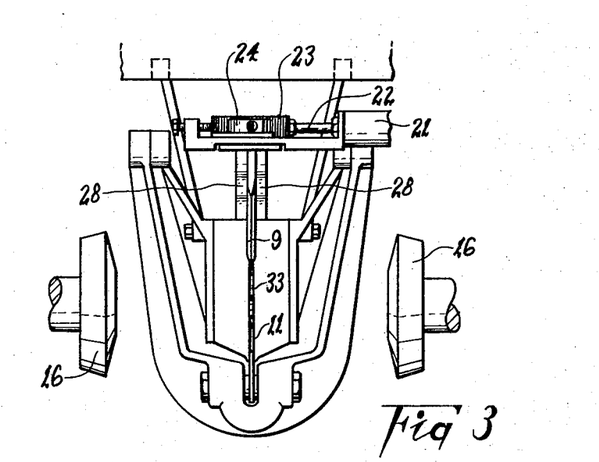
FIG. 3 is a front elevational view of the knife assembly shown in FIG. 1.

The various blades of the knife assembly are positioned as shown in FIGS. 1 and 3 when an article of fruit 6 is being moved into the de-stoning station 7 by the transfer arm 2. Upon entering the station 7 the article of fruit 6 is partially split by engagement with the blade 11 and is impaled on that blade. The rotatable cam 25 then arrives at the position shown in FIG. 5 at which it allows bell-crank lever 28 to swing about the pivot 29 in a direction such that the blade 9 is moved downwardly to the position shown in FIG. 4. In that position the longitudinal axis of the coring blade 18 is still substantially within a plane containing the cutting edges 14 and 15 of the slicing blades and extends partway around the fruit stone 12 as is also shown in FIG. 4.

Figure 6:
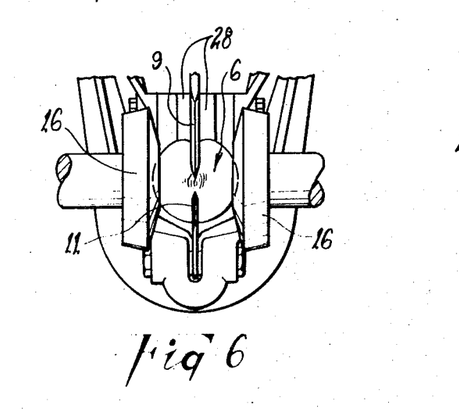
FIG. 6 is a view similar to FIG. 3 but showing the blades positioned as in FIG. 4 and the twisting cups moved into engagement with the article of fruit.
Figure 8:
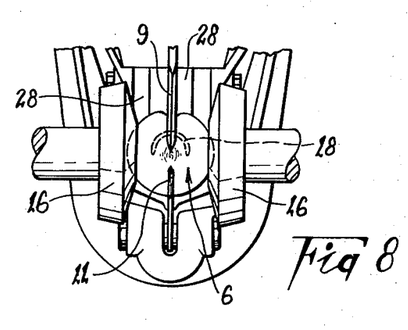
FIG. 8 is a view similar to FIG. 6 but showing the coring knife positioned as in FIG. 7.
Figure 9:
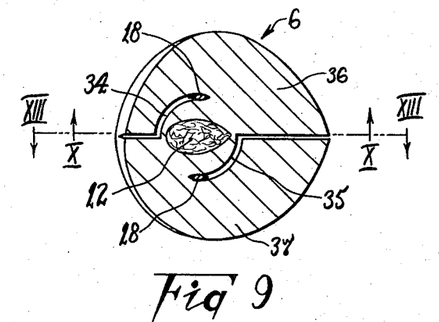
FIG. 9 is a cross-sectional view taken along line IX—IX of FIG. 7.

At this stage of the operation, the torque cups 16 are moved inwardly towards one another so as to engage respective opposite sides of the article of fruit 6 as shown in FIG. 6. The actuator 21 then functions to turn the coring blade 18 through substantially 90° into the operative position shown in FIGS. 7 and 8, and during that movement of the blade 18 it cuts two part spherical grooves 34 and 35 within the body of the article of fruit 6 and around the stone 12 (see FIGS. 9 and 10).

Figure 10:
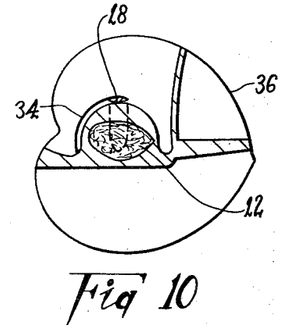
FIG. 10 is a cross-sectional view taken along line X—X of FIG. 9.
Figure 11:
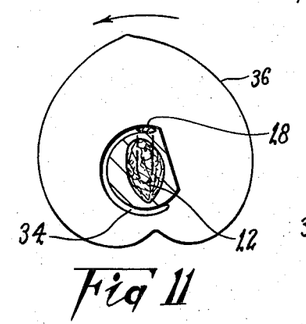
FIGS. 11 and 12 are views similar to FIG. 10 but showing the progressive coring of the particular half-section of fruit shown during turning movement of that section under the influence of the torque cups.
Figure 12:
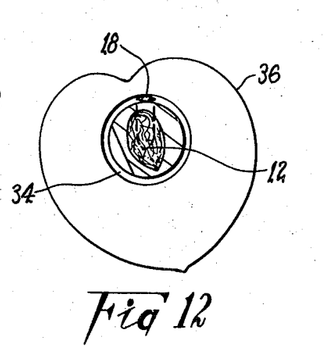
Figure 13:
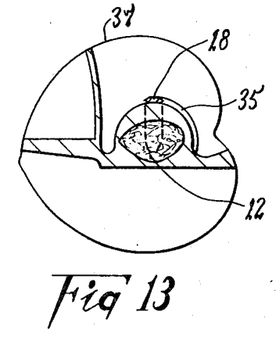
FIGS. 13 to 15 are similar to FIGS. 10 to 12, but relate to a section taken along line XIII—XIII of FIG. 9.
Figure 14:
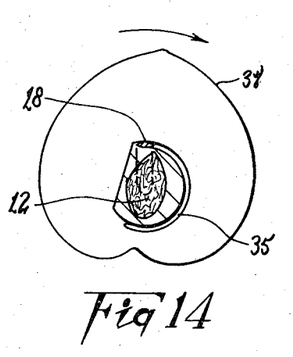
Figure 15:
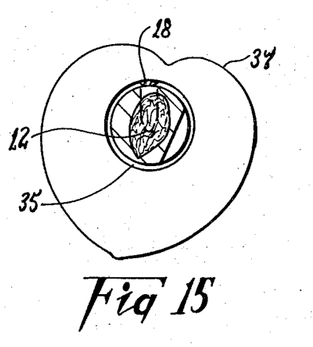

FIG. 10 shows how the article of fruit 6 is almost divided into two half-sections before rotation of the torque cups 16, and it also shows the beginning of separation of the core 32 from the main body of the article of fruit 6. The other half-section of the article of fruit is shown by FIG. 13. In conventional apparatus of the kind under consideration, it is usual for the torque cups 16 to be rotatable in opposite directions so as to complete separation of the half-sections 36 and 37 (see FIG. 16) while at the same time separating the stone 12 by causing relevant movement between it and the half-sections 36 and 37. The embodiment of the invention so far described is adaptable to such conventional apparatus so that FIGS. 11, 12, 14 and 15 show how complete coring is effected by the coring blade 18 during rotational movement of the two half-sections 36 and 37 in opposite directions. FIGS. 11 and 12 relate to the half-section 36 and FIGS. 14 and 15 relate to the half-section 37.

It will be understood from the foregoing that, before rotation of the torque cups 16, the coring blade 18 has formed two cuts 34 and 35 in the fruit body, which cuts extend along a circular path slightly outwards of the stone 12, and each cut extends through an arc of 90° (or thereabouts) only. When the torque cups 16 are rotated in opposite directions to separate the half-sections 36 and 37, each half-section is moved relative to the coring blade 18 so that each of the cuts 34 and 35 is extended in its respective half-section through a further arc of at least 270°. That is, there is at least 360° of relative movement between the article of fruit 6 and the coring blade 18 so that a substantially spherical core portion 32 is thereby separated from the main body of the article of fruit 6. The stone 12 is of course contained within that core portion.

It will be seen from the foregoing that the apparatus can be selectively operated to cause removal of a core portion 32 of the fruit, or to remove the stone 12 alone. In the latter case, the coring blade 18 is retained in the inoperative position as shown in FIG. 1.

If the apparatus is to be used to remove the stone 12 alone, it is generally convenient for the stone 12 to be gripped between the upper and lower blades 9 and 11, whereas in the coring operation it is necessary to have clearance between the stone 12 and the blade edges which defines the recess 13. For that purpose, adjustable stop means (not shown) may be provided so as to enable variation of the lowermost position of the upper blade 9 according to the particular de-stoning method to be employed. The lower blade 11 may be mounted for lengthwise movement relative to the upper blade 9, as previously mentioned, so as to enable positive ejection of a stone 12 from the blade recess 13, particularly when the coring blade method is not being used.

A locator (not shown) may be provided on or adjacent the upper slicing blade 9 to engage the fruit stone 12 during location of the fruit within the de-stoning station 7, and positively resist further movement of the stone 12 beyond the de-stoning position. In particular, such a locator ensures that the stone 12 is suitably positioned relative to the coring blade 18. In one form, the locator may be formed by a small extension provided on one of the slicing blades.

In a modification (not shown) of the apparatus described, the aforementioned upper and lower blades 9 and 11 do not function as the principal slicing blades, or alternatively they form part only of the slicing blades. In the first alternative, the principal upper and lower slicing blades may be located between the knife assembly 8 and the orienting conveyor so as to engage and initiate slicing an article of fruit before that article is engaged by the transfer arm 2. That is, the transfer cradle may move an article of fruit from the conveyor and deposit that article on the lower slicing blade so that it is impaled and held by that blade. The transfer arm 2 may then engage that article of fruit and move it along the lower slicing blade towards the de-stoning station 7, and in the course of that movement the fruit will be engaged by the upper slicing blade so as to complete the slicing operation. With this arrangement, the blades 9 an 11 may be arranged to simply spread the cut formed by the slicing blades, but their primary function is to provide a location for the fruit stone 12 and a support or carrier for the coring blade 18.

In the second alternative, the upper and lower blades 9 and 11 are simply extended so as to engage and initiate slicing of an article of fruit before that article is engaged by the transfer arm 2. Thus, the operation is as described in relation to the first alternative, and the only difference is that each slicing blade also forms part of the knife assembly 8 rather than a component separate therefrom.

The advantage of the modification described is that the slicing blades resist movement of the article of fruit from its oriented position, during transfer to the de-stoning station. With the conventional arrangement, the transfer arm 2 alone supports the fruit during a substantial part of the transfer movement, and some movement of the fruit relative to the transfer arm 2 can occur because of the location of the impaling prongs one above the other. A group of widely separated prongs cannot be used because of the resulting damage to the fruit.

Figure 17:
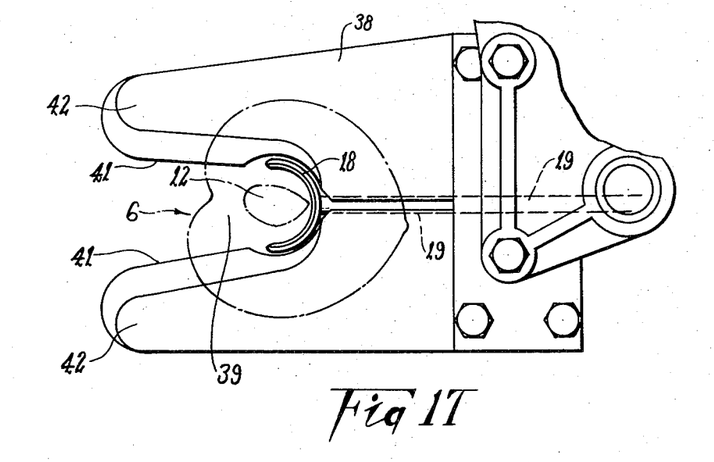
FIG. 17 is a side elevational view of another embodiment of a knife assembly according to the invention.
Figure 18:
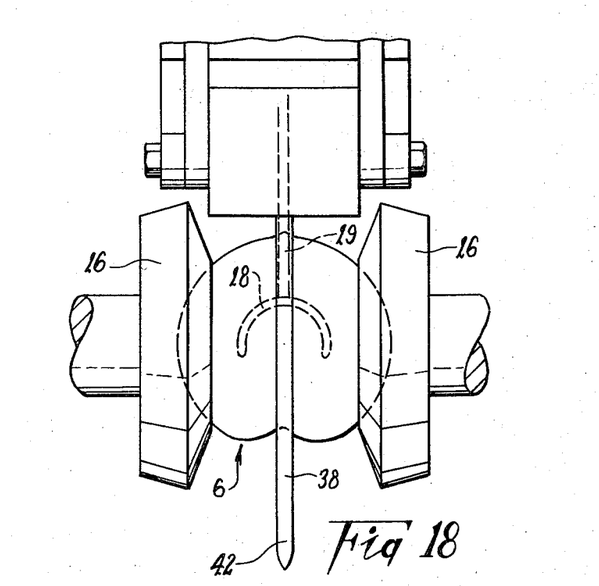
FIG. 18 is a plan view of the assembly shown in FIG. 17 showing an article of fruit impaled on the knife assembly and engaged by the torque cups of the apparatus.

A further embodiment of the invention which is adaptable to the modification just described if desired, is shown in FIGS. 17 and 18 of the drawings. This embodiment does not make use of the conventional separable slicing blades, but includes a single blade 38 having a U-shaped recess 39 therein for receiving the stone 12 of an article of fruit. A cutting edge 41 is formed along each side of the recess 39 and each of those edges extends across the front nose portions 42 of the blade 38 so as to facilitate penetration of an article of fruit. The coring knife 17 is constructed as in the former embodiment and may be also actuated in the manner previously described. As will be seen from FIG. 17, the coring blade 18 is located within the base of the recess 39, and the spindle 19 is rotatably mounted in a rear part of the blade 38 which defines the base of the recess 39.

Adjusting means (not shown) may be provided to permit the axial position of the spindle 19 to be changed and thereby re-position the blade 18 to suit fruit stones 12 of different sizes. Similar adjustability of the core blade 18 may be provided in the embodiment of FIG. 1.

In operation of the embodiment of FIGS. 17 and 18, an article of fruit 6 is deposited within the de-stoning station generally as described in relation to the previous embodiment, and the torque cups 16 are moved into engagement with the article of fruit 6 as shown in FIG. 18. Thereafter, the slicing and de-coring progresses as in the previous embodiment except with the torque cups 16 are preferably rotated both in the same direction rather than in opposite directions as in conventional apparatus. Nevertheless, opposite rotation can be employed if desired, just as one direction of rotation may be seen if desired in the first embodiment.

It will be clear from the foregoing, that de-stoning mechanism as described can be applied to existing de-stoning apparatus with little difficulty. Thus, the invention resides in knife assembly or mechanism for use in de-stoning apparatus, and also resides in apparatus including such mechanism.

One method according to the invention includes the steps of slicing an article of fruit along a median line, holding the article of fruit stationary and inserting a blade into the flesh of the fruit adjacent the stone so as to make a circular incision part way about that stone (preferably along the suture line), and then turning each of the two half-sections of the sliced fruit relative to the aforementioned blade so as to effect complete separation of a spherical core from the main body of the fruit. Preferably, the two half-sections of the fruit are turned in opposite directions.

The method described may be modified by addition of further steps as will be understood from the preceding description of typical apparatus. That is, it is to be understood that some features of the method according to the invention are inherent in the apparatus described.

A further method according to the invention involves impaling an article of fruit on one of two spaced slicing blades after removal of that fruit from an orienting conveyor or other transport mechanism, and then moving the article of fruit between the blades whilst impaled thereon, towards a de-stoning station. That method may be combined with the other method particularly described above.

Persons skilled in the relevant art will readily appreciate the numerous advantages resulting from the method and apparatus according to this invention. It is of particular importance that apparatus embodying the invention can be conveniently adjusted to operate on either one of two de-stoning techniques. As a result, such apparatus has much greater flexibility than conventional apparatus. A further feature of a preferred form of apparatus according to the invention, is that articles of fruit are positively held against movement of a desired position, during transfer from the orienting conveyor to the de-stoning station.

Finally, it is to be understood that various alterations, modifications and/or additions may be introduced into the constructions and arrangements of parts previously described without departing from the spirit or ambit of the invention, as defined by the appended claims.

Having now described my invention, what I claim as new and desire to secure by letters Patent is:

1. A fruit de-stoning apparatus including: at least one slicing blade; a coring knife having an elongate semi-circular blade which is mounted for rotation about an axis extending substantially radially thereof; said coring knife blade being located adjacent a cutting edge of said slicing blade and arranged so that the axis of rotation thereof and said cutting edge are substantially within a single plane; drive means connected to said coring knife blade and being operable to rotate that blade between a rest position in which its longitudinal axis is located substantially within said single plane, and an operative position in which it extends laterally beyond each of two opposite side surfaces of said slicing blade; and turning means for gripping an article of fruit impaled on said slicing blade and being operative to rotate said article relative to both said blades about an axis extending transverse to the slicing blade.

2. Apparatus according to claim 1, wherein said slicing blade and said coring knife each forms part of a knife assembly, and a spindle is rotatably mounted with said assembly and has one end secured to a mid-portion of the coring knife blade, said spindle being connected to said drive means so as to form part of the drive connection between that means and the coring knife blade.

3. Apparatus according to claim 2, wherein said knife assembly includes a further said slicing blade, one of said slicing blades having a recess in an edge thereof which is located adjacent the other said slicing blade, said coring knife spindle is rotatably mounted within said recessed slicing blade and arranged so that said coring knife blade is located within said recess, and either one of said slicing blades is movable towards and away from the other slicing blade.

4. Apparatus according to claim 3, including transfer mechanism operable to move an article of fruit onto the stationary one of said slicing blades so as to be partially split thereby, and control means is operatively connected to the movable slicing blade so as to separate and close the slicing blades in synchronism with movement of said transfer mechanism.

5. Apparatus according to claim 2, wherein said slicing blade defines a substantially U-shaped recess and the coring knife blade is located within the base of that recess, a cutting edge is formed along each of two opposed sides of said recess, each said cutting edge continuing into a respective outer edge of the slicing blade which extends laterally of said recess, and said coring knife spindle is rotatably mounted within part of said slicing blade which defines said recess base.

6. Fruit de-stoning apparatus including: a knife assembly comprising at least one slicing blade and a coring knife; said coring knife having an elongate blade which is provided with a cutting edge along each of two opposite longitudinal sides and which is bent between its ends so that said cutting edges follow a substantial semi-circular path, and a spindle rotatably mounted on part of said knife assembly and secured to a mid-portion of said coring knife blade so as to extend substantially radially thereof; drive means connected to said spindle and operable to cause rotation thereof to move said coring knife blade between a rest position in which it does not extend substantially beyond either side of said slicing blade, and an operative position in which it extends laterally beyond each said side of the slicing blade; transfer mechanism for moving an article of fruit onto said slicing blade so as to be partially split thereby; and turning means for engaging an article of fruit impaled on said slicing blade and being operable to cause rotation of said article of fruit relative to the slicing blade and thereby split that article along a medial plane.

7. Apparatus according to claim 6, wherein said knife assembly includes a further said slicing blade, one of said slicing blades having a recess in an edge thereof which is located adjacent the other said slicing blade, said coring knife spindle is rotatably mounted within said recessed slicing blade and arranged so that said coring knife blade is located within said recess, and either one of said slicing blades is movable towards and away from the other slicing blade.

8. Apparatus according to claim 7, wherein control means is operatively connected to the movable slicing blade so as to separate and close the slicing blades in synchronism with movement of said transfer mechanism.

9. Apparatus according to claim 6, wherein said slicing blade defines a substantially U-shaped recess and the coring knife blade is located within the base of that recess, a cutting edge is formed along each of two opposed sides of said recess, each said cutting edge continuing into a respective outer edge of the slicing blade which extends laterally of said recess, and said coring knife spindle is rotatably mounted within part of said slicing blade which defines said recess base.

10. A knife assembly for use in fruit de-stoning apparatus including, at least one slicing blade; a coring knife having an elongate semi-circular blade which is mounted for rotation about an axis extending substantially radially thereof; said coring knife blade being located adjacent a cutting edge of said slicing blade and arranged so that the axis of rotation thereof and said cutting edge are substantially within a single plane; whereby said coring blade is movable relative to said slicing blade between a rest position in which its longitudinal axis is located substantially within said single plane, and an operative position in which it extends laterally beyond each of two opposite side surfaces of said slicing blade.

11. A method of de-stoning fruit including the steps of: impaling an article of fruit on a slicing blade and simultaneously locating a semicircular narrow coring blade within the body of said article so that it extends part-way around the stone of said article, rotating said coring blade through substantially 90° so that it extends laterally beyond each of two opposite sides of said slicing blade, and thereafter rotating said article relative to both said blades about an axis extending transverse to the slicing blade, whereby said article is sliced into two half-sections and a spherical core containing said stone is simultaneously separated from said half-sections.

* * * * *

UNITED STATES PATENT AND TRADEMARK OFFICE
CERTIFICATE OF CORRECTION

PATENT NO. : 3,829,591
DATED : August 13, 1974
INVENTOR(S) : DAVID A. BROWNE

It is certified that error appears in the above-identified patent and that said Letters Patent are hereby corrected as shown below:

In the caption include:

--Claim of priority:

Priority claim based upon Commonwealth of Australia Patent Application No. PA8212, filed March 8, 1972.--

Signed and sealed this 15th day of July 1975.

(SEAL)
Attest:

RUTH C. MASON
Attesting Officer

C. MARSHALL DANN
Commissioner of Patents
and Trademarks